United States Patent

[11] 4,276,415
[45] Jun. 30, 1981

Degen et al.

[54] BASIC DYES

[76] Inventors: Hans-Jürgen Degen, 6 Schillerstrasse, 6143 Lorsch; Klaus Grychtol, 96A Seebacher Strasse, 6702 Bad Duerkheim 1, both of Fed. Rep. of Germany

[21] Appl. No.: 109,045

[22] Filed: Jan. 2, 1980

[30] Foreign Application Priority Data

Jan. 25, 1979 [DE] Fed. Rep. of Germany ....... 2902763

[51] Int. Cl.³ .................... C09B 23/02; C07D 471/14; C07D 487/04
[52] U.S. Cl. ..................... 542/435; 542/449; 542/450; 542/452; 548/324; 162/162
[58] Field of Search ................ 548/324; 542/449, 450, 542/452, 435; 162/162

[56] References Cited

U.S. PATENT DOCUMENTS

| 3,243,298 | 3/1966 | Libeer et al. | 548/324 |
| 3,880,869 | 4/1975 | Libeer et al. | 548/324 |
| 3,931,156 | 1/1976 | Libeer et al. | 548/324 |
| 4,003,750 | 1/1977 | Heseltine et al. | 542/452 |

*Primary Examiner*—Arthur P. Demers
*Attorney, Agent, or Firm*—Oblon, Fisher, Spivak, McClelland & Maier

[57] ABSTRACT

Basic dyes of the general formula

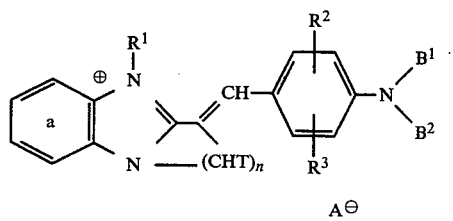

where
A$^\ominus$ is an anion,
$R^1$ is unsubstituted or substituted alkyl or a radical of the formula

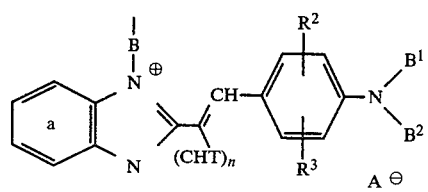

where
B is a bridge member,
n is 2, 3 or 4, T is hydrogen or $C_1$–$C_4$-alkyl,
$R^2$ is hydrogen, methyl, ethyl, hydroxyl, methoxy or ethoxy,
$R^3$ is hydrogen, chlorine, methyl or ethyl,
$B^1$ is hydrogen or unsubstituted or substituted alkyl,
$B^2$ is a radical of the formula

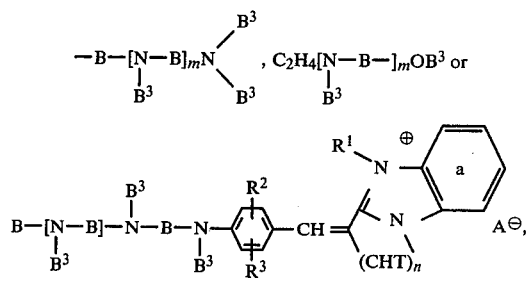

m is 0, 1, 2 or 3,
the radicals $B^3$ independently of one another are hydrogen, $C_1$–$C_4$-alkyl, or $C_2$–$C_3$-alkyl which is substituted by

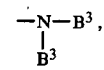

hydroxyl or $C_1$–$C_4$-alkoxy,

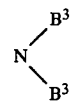

may also be pyrrolidino, piperidino, morpholino, piperazino, N-methylpiperazino, N-β-hydroxyethylpiperazino or hexamethyleneimino and
the ring a may be additionally substituted and, if a compound of the formula I contains a radical B or

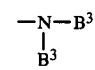

in the radical $R^1$, $B^2$ may also be a group $B^1$ or

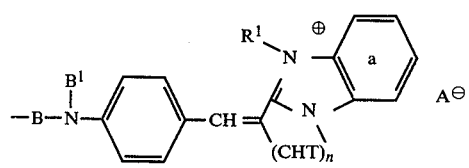

The dyes are very suitable for coloring paper stock.

2 Claims, No Drawings

BASIC DYES

The present invention relates to compounds of the formula I

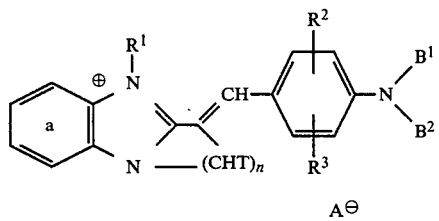

where
A$^\ominus$ is an anion,
R$^1$ is unsubstituted or substituted alkyl or a radical of the formula

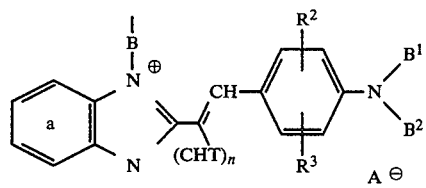

where
B is a bridge member,
n is 2, 3 or 4,
T is hydrogen or C$_1$–C$_4$-alkyl,
R$^2$ is hydrogen, methyl, ethyl, hydroxyl, methoxy or ethoxy,
R$^3$ is hydrogen, chlorine, methyl or ethyl,
B$^1$ is hydrogen or unsubstituted or substituted alkyl,
B$^2$ is a radical of the formula

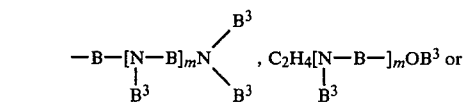

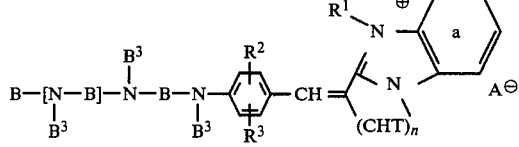

m is 0, 1, 2 or 3,
the radicals B$^3$ independently of one another are hydrogen, C$_1$–C$_4$-alkyl, or C$_2$–C$_3$-alkyl which is substituted by

hydroxyl or C$_1$–C$_4$-alkoxy,

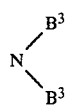

may also be pyrrolidino, piperidino, morpholino, piperazino, N-methylpiperazino, N-$\beta$-hydroxyethylpiperazino or hexamethyleneimino and
the ring a may be additionally substituted and, if a compound of the formula I contains a radical B or

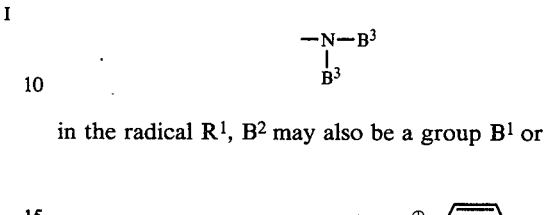

in the radical R$^1$, B$^2$ may also be a group B$^1$ or

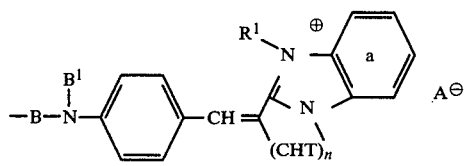

Bridge members B may be identical or different and may be symmetrical or unsymmetrical; examples are:

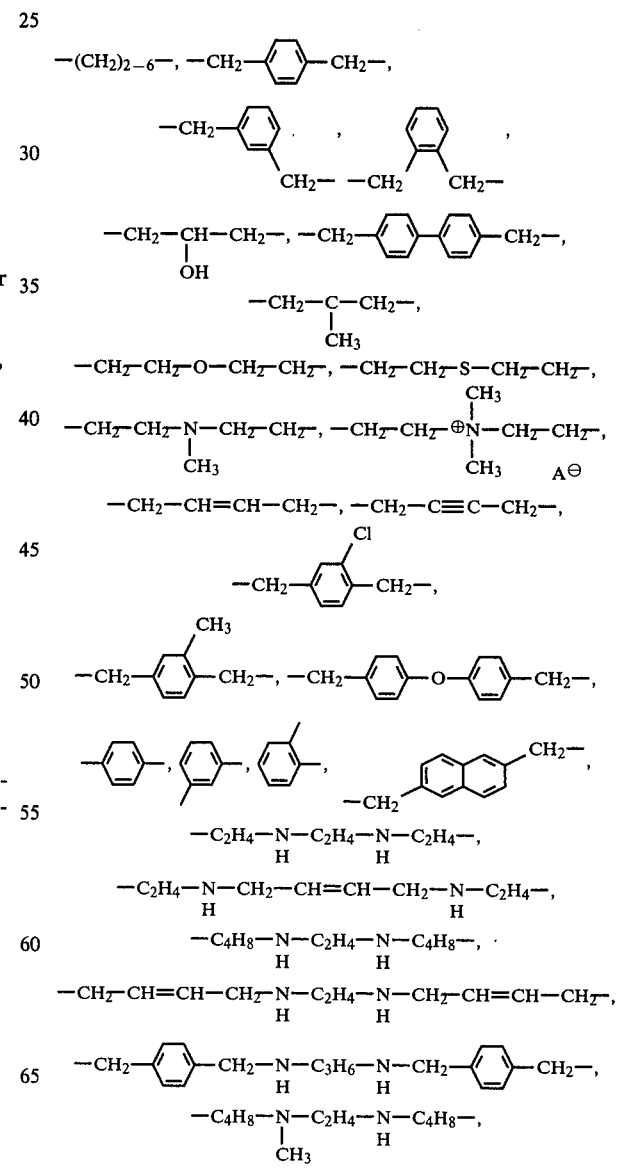

-continued

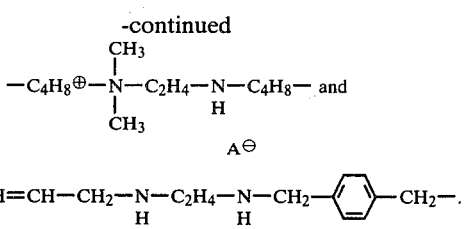

—CH$_2$—CH=CH—CH$_2$—N—C$_2$H$_4$—N—CH$_2$—〈ring〉—CH$_2$—.
　　　　　　　　　　　　H　　　　　　H

Examples of anions A$^\ominus$ are fluoride, chloride, bromide, iodide, perchlorate, bisulfate, sulfate, aminosulfate, nitrate, dihydrogen phosphate, hydrogen phosphate, phosphate, bicarbonate, carbonate, methosulfate, ethosulfate, cyanate, thiocyanate, tetrachlorozincate, borate, tetrafluoborate, acetate, chloroacetate, cyanoacetate, hydroxyacetate, aminoacetate, methylaminoacetate, dichloroacetate, trichloroacetate, 2-chloropropionate, 2-hydroxypropionate, glycolate, thioglycolate, thioacetate, phenoxyacetate, trimethylacetate, valerate, palmitate, acrylate, oxalate, malonate, crotonate, succinate, citrate, methylene-bis-thioglycolate, ethylene-bis-iminoacetate, nitrilotriacetate, fumarate, maleate, benzoate, methylbenzoate, chlorobenzoate, dichlorobenzoate, hydroxybenzoate, aminobenzoate, phthalate, terephthalate, indolylacetate, chlorobenzenesulfonate, benzenesulfonate, toluenesulfonate, biphenylsulfonate and chlorotoluenesulfonate.

Advantageously, the anions are selected so as to ensure optimum solubility in water. Examples of anions which have proved valuable for this purpose are acetate, chloride, methosulfate, formate, ethosulfate and aminosulfate.

Examples of radicals R$^1$ are methyl, ethyl, propyl, butyl, hexyl, dodecyl, 2-chloroethyl, 4-chlorobutyl, 4-chlorobuten-2-yl, 2-hydroxy-3-chloropropyl, 2-cyanoethyl, 2-hydroxyethyl, benzyl, o-, m- and p-chloromethylbenzyl, 4-methylbenzyl,

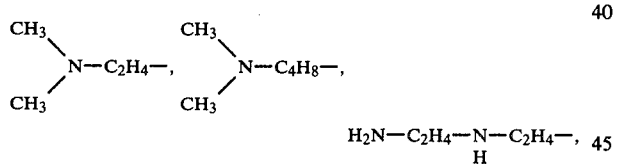

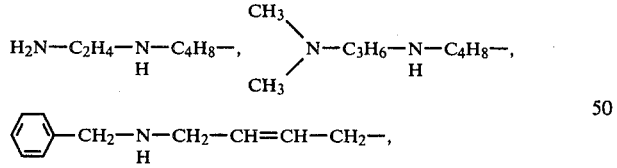

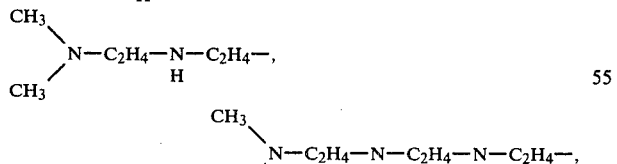

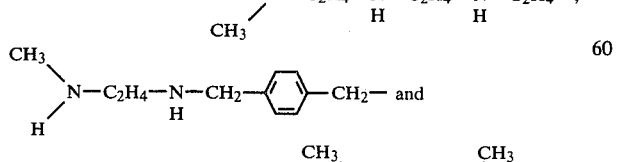

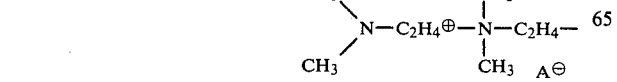

Examples of preferred radicals R$^1$ are methyl, ethyl, benzyl,

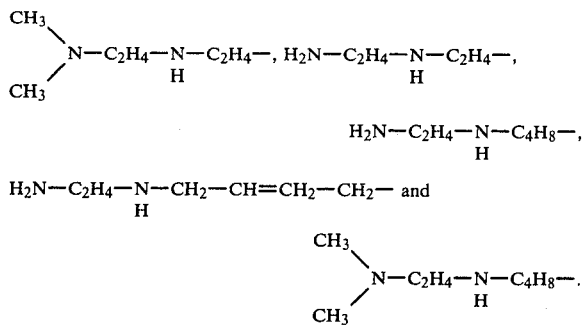

In addition to hydrogen, which is preferred, T may be, for example, methyl, ethyl, n-propyl, i-propyl, n-butyl or i-butyl.

Examples of radicals B$^1$ are C$_1$–C$_4$-alkyl, which may additionally be substituted by hydroxyl, chlorine, cyano, C$_1$–C$_4$-alkoxy, C$_1$–C$_4$-alkylcarbonyloxy, amino, C$_1$–C$_6$-alkylamino, C$_1$–C$_6$-dialkylamino, aminoalkylamino or hydroxyalkylamino.

Further examples of radicals B$^1$ are cyclohexyl, benzyl, phenylethyl and allyl.

Specific examples of radicals R$^3$, in addition to hydrogen, are methyl, ethyl, propyl, hexyl, cyclohexyl, aminoethyl, methylaminoethyl, dimethylaminoethyl, aminopropyl, methylaminopropyl, benzyl, hydroxyethyl, hydroxypropyl, methoxyethyl and ethoxyethyl.

The ring a may additionally be monosubstituted or polysubstituted by, for example, methyl, ethyl, chlorine, nitro or dimethylamino.

A compound of the formula I may be prepared, for example, by condensing a compound of the formula Ia

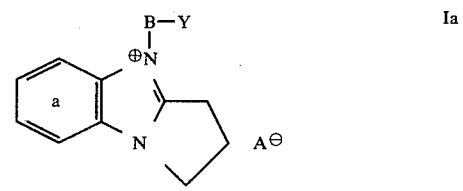

where Y is a group removable as an anion, e.g. chlorine or methosulfate, with an aldehyde of the formula II

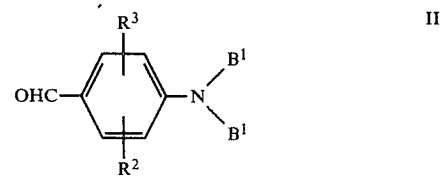

to give a compound of the formula Ib

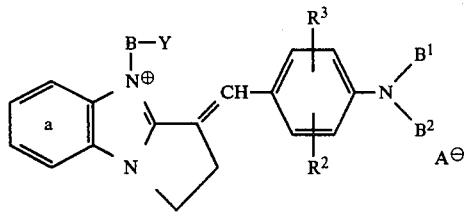
Ib and then reacting the latter with an amine of the formula

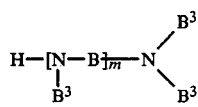

to give a compound of the formula Ic

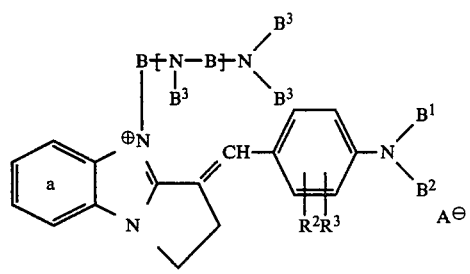
Ic

Further, it is possible, for example, to condense a compound of the formula Id

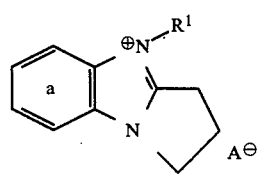
Id where $R^1$ is unsubstituted or substituted alkyl, but does not contain a radical which can be split off as an anion, with a compound of the formula IIa

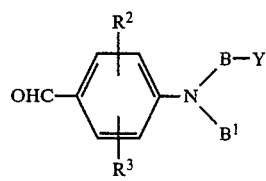
IIa to give a compound of the formula Ie

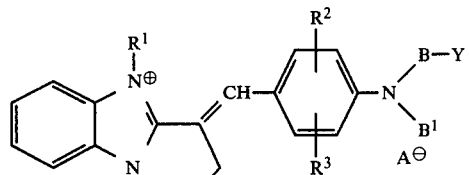
Ie where Y has the stated meaning.

Starting from a compound of the formula Ie, reaction with one mole equivalent of an amine or polyamine of the formula

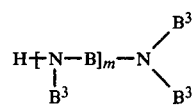

gives a compound of the formula If

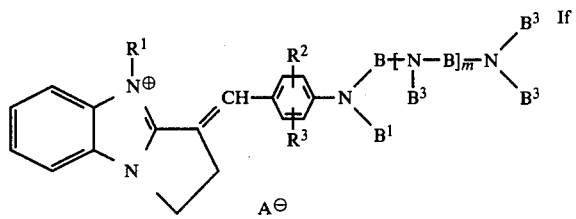
If

Further, a compound of the formula Ie may be reacted with half a mole equivalent of a diamine or polyamine to give a compound of the formula Ig

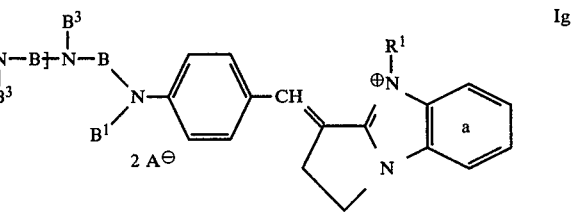
Ig

In a similar manner, a compound of the formula Ib, where $B^2$ has the meaning of $B^1$, may be reacted with half a mole equivalent of an amine of the formula

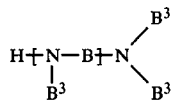

to give a compound of the formula Ih

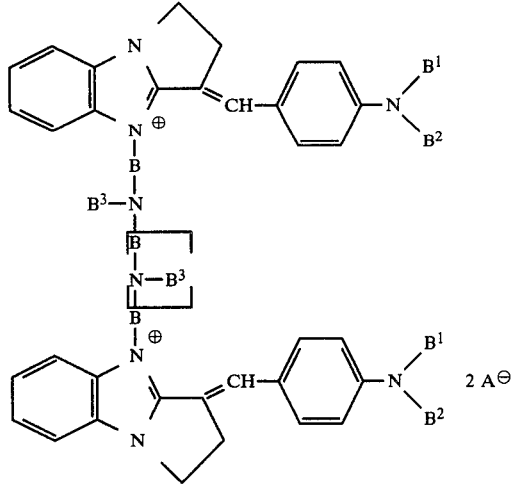

Reaction of a compound of the formula

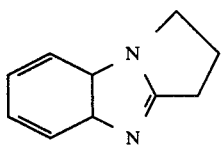

with an alkylating agent of the formula

Y—B—Y followed by condensation with an aldehyde of the formula II gives a compound of the formula Ii

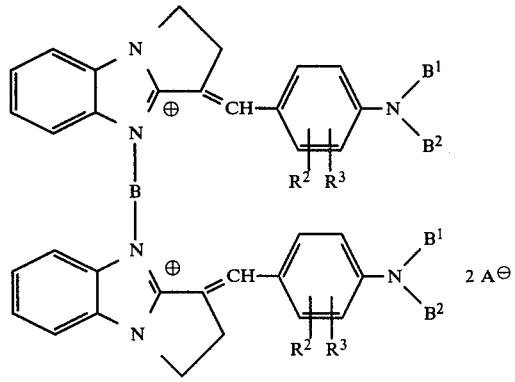

The synthesis of the dyes of the formula I can be carried out in the presence or absence of a solvent. In order to obtain liquid formulations which present no problems, it is advantageous to employ a water-miscible organic solvent, for example glycol, diglycol, glycerol, dimethylformamide, dimethylsulfoxide, thiodiglycol, isopropanol or ethanol.

Suitable condensing agents are, in particular, bases, e.g. alkalis and primary, secondary and tertiary amines, preferably piperidine, pyrrolidine, ethylenediamine, N,N-dimethylethylenediamine and 1,3-propylenediamine. Of course dye powders can also be isolated from the dye solutions described in Examples 1–63 by adding salt solutions, such as a solution of sodium chloride or of zinc chloride.

Compounds of particular importance are those of the formula I, where n is 2, $R^1$ is methyl or a radical of the structure $$—C_2H_4—Z, \quad —C_4H_8—Z,$$
$$—CH_2—CH=CH—CH_2—Z,$$

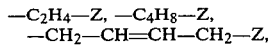

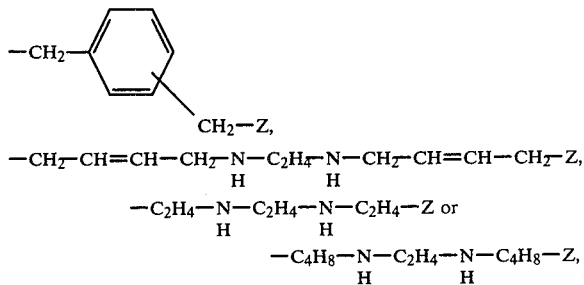

T, $R^1$ and $R^3$ are hydrogen, $B^1$ is $C_1$–$C_4$-alkyl, chloroethyl, dimethylaminoethyl or benzyl, $B^3$ is hydrogen, methyl, chloroethyl or dimethylaminoethyl, Z is a radical of the formula

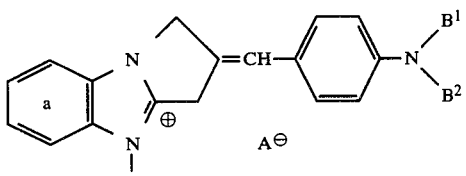

$A^\ominus$ and $B^2$ have the stated meanings and the ring a may be substituted by methyl.

Preferred examples of $B^2$ are methyl, ethyl, chloroethyl, dimethylaminoethyl,

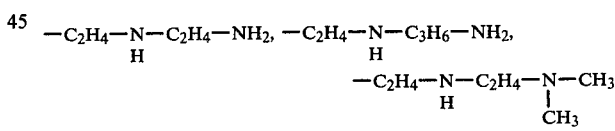

and radicals of the formula

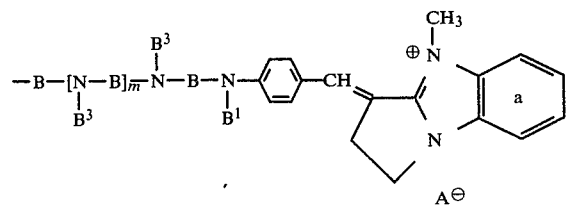

where

B is —$C_2H_4$—, $B^3$ is hydrogen, m is 1 and $B^1$ is methyl or ethyl.

The compounds of the formula I are yellow and are suitable for coloring anionic products and especially for coloring paper. Specific examples of paper raw materials which may be colored with these products are bleached sulfite cellulose, bleached sulfate cellulose, groundwood, sulfite cellulose, sulfate cellulose and mixtures of these.

The compounds of the formula I show virtually no change in hue on adding fillers, for example china clay, to the paper stock, and are therefore exceptionally suitable for use with both clay-containing and clay-free papers. The substantivity of the compounds according to the invention is very high, so that they may also be used for coloring papers made from pure cellulose.

In the Examples which follow, parts and percentages are by weight, unless stated otherwise.

EXAMPLE 1

17.5 g of p-xylylene dichloride and 17.2 g of 5- and 6-methylpyrrolidino-[1,2-a]-benzimidazole in 50 ml of ethylene glycol are heated for 1 hour at 90° C. and 6 g of ethylenediamine are then added. After a further hour, 15 g of p-dimethylaminobenzaldehyde and 3 g of pyrrolidine are added at 70° C. and this temperature is maintained for a further 2 hours. On adding 50 ml of glacial acetic acid, a liquid formulation of a yellow dye of the structure

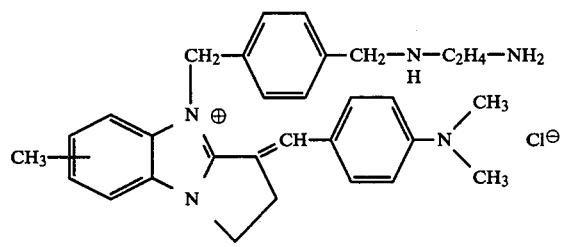

is obtained; this dyes groundwood, mixtures of groundwood and bleached sulfite cellulose, and pure celluloses, in greenish yellow hues, with virtually complete exhaustion.

In a similar manner, reaction of half a mole of a bifunctional alkylating agent $Y-P^1-Y$, where Y is chlorine or bromine, with pyrrolidino- or piperidino-[1,2-a]-benzimidazoles, followed by reaction with an amine or polyamine $HP^2$ and subsequent condensation with a p-aminobenzaldehyde of the formula

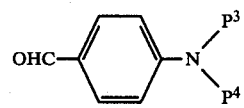

gives a dye of the general formula

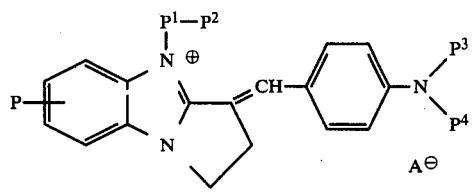

Table 1 below gives examples of dyes of this type, which have been synthesized by methods similar to Example 1:

TABLE 1

| Example | P | $P^1$ | $P^2$ | $P^3$ | $P^4$ |
|---|---|---|---|---|---|
| 2 | H | $C_2H_4$ | $-HN-C_2H_4-NH_2$ | $C_2H_5$ | $C_2H_5$ |
| 3 | H | " | $-HN-C_3H_6-NH_2$ | $CH_3$ | $CH_3$ |
| 4 | H | $C_4H_8$ | " | " | " |
| 5 | H | $CH_2-CH=CH-CH_2$ | " | " | " |
| 6 | H | $-CH_2-\langle\rangle-CH_2-$ | " | " | " |
| 7 | $CH_3$ | " | " | " | " |
| 8 | $CH_3$ | $C_4H_8$ | $-HN-C_2H_4-N(CH_3)_2$ | $C_2H_5$ | $C_2H_5$ |
| 9 | $CH_3$ | " | " | $C_2H_4Cl$ | " |
| 10 | $CH_3$ | " | $-HN-C_6H_{12}-NH_2$ | " | " |
| 11 | $CH_3$ | " | $-HN-C_2H_4-NH-C_2H_4-NH_2$ | " | " |
| 12 | $CH_3$ | " | $-HN-C_3H_6-NH-C_3H_6-NH_2$ | $CH_3$ | $CH_3$ |
| 13 | $CH_3$ | " | " | $CH_2-C_6H_5$ | $CH_3$ |
| 14 | $CH_3$ | " | $-HN-C_2H_4OH$ | $CH_3$ | $CH_3$ |
| 15 | H | " | $-HN-C_2H_4-O-C_2H_4-NH_2$ | " | " |
| 16 | H | $C_4H_8$ | $-N(C_4H_9)H$ | $CH_3$ | $CH_3$ |
| 17 | H | $C_2H_4$ | $-N(CH_3)_2$ | " | " |
| 18 | $CH_3$ | " | " | " | " |

TABLE 1-continued

| Example | P | P¹ | P² | P³ | P⁴ |
|---------|---|-----|-----|-----|-----|
| 19 | H | " | —N(C₃H₇)₂ | —C₂H₄—N(CH₃)₂ | " |

EXAMPLE 20

16 g of pyrrolidino-[1,2-a]-benzimidazole are dissolved in 25 ml of thiodiglycol, 6.3 g of 1,4-dichlorobutane are added and the mixture is heated for 2 hours at 130° C. It is then cooled to 70° C., 21 g of N-ethyl-N-(2-chloroethyl)-p-aminobenzaldehyde, followed by 4 g of piperidine, are added and the batch is kept for 2 hours at 70° C. Thereafter 7 g of ethylenediamine are added and the batch is heated at 140° C. for 1 hour. On adding 30 ml of glacial acetic acid, a liquid formulation of the dye of the formula

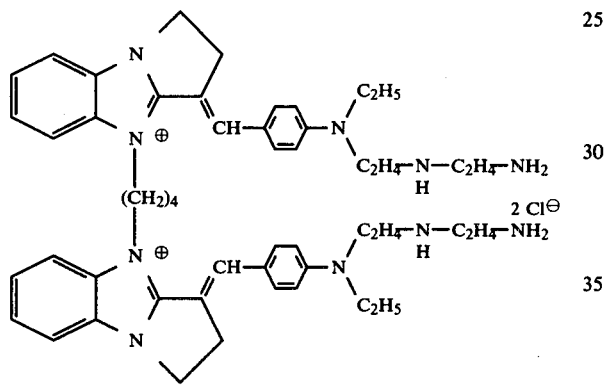

is obtained, which colors paper in greenish yellow hues.

Using methods similar to Example 20, reaction of a bifunctional alkylating agent of the formula Y—P⁵—Y with a pyrrolidinobenzimidazole in the molar ratio of 1:2 gives, quite generally, a compound of the structure

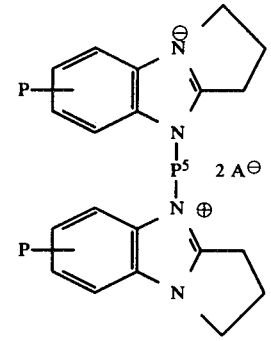

Condensation of such a compound with an aldehyde of the general formula

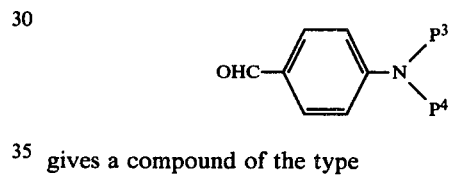

gives a compound of the type

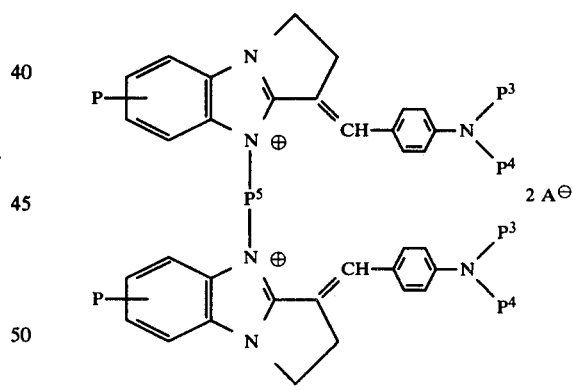

which, if P⁴ contains a leaving group Y, for example chlorine or bromine, can be reacted further with an amine.

Table 2 below lists further dyes which have been obtained by this type of synthesis.

TABLE 2.

| Example | P | P³ | P⁴ | P⁵ |
|---------|---|-----|-----|-----|
| 21 | H | —C₂H₅ | —C₂H₄—N(H)—C₂H₄—NH₂ | —C₂H₄— |
| 22 | " | " | " | —C₄H₈— |
| 23 | " | " | " | —CH₂—CH=CH—CH₂— |
| 24 | " | " | " | —CH₂—C₆H₄—CH₂— |

TABLE 2-continued

| Example | P | P³ | P⁴ | P⁵ |
|---|---|---|---|---|
| 25 | CH₃ | " | —C₂H₄—N(H)—C₂H₄—N(CH₃)(CH₃) | " |
| 26 | " | CH₃ | " | CH₂—C₆H₄—CH₂— |
| 27 | CH₃ | CH₃ | C₂H₄—N(H)—C₆H₁₂—NH₂ | CH₂—C₆H₄—CH₂— |
| 28 | " | " | C₂H₄—N(H)—C₃H₆—NH₂ | " |
| 29 | H | " | C₂H₄—N(H)—C₃H₆—N(H)—C₃H₆—NH₂ | " |
| 30 | " | " | " | C₄H₈ |
| 31 | H | " | CH₃ | " |
| 32 | H | C₂H₅ | C₂H₅ | " |
| 33 | CH₃ | C₂H₄Cl | " | " |
| 34 | " | CH₃ | C₂H₄—N(H)—C₆H₅ | " |

EXAMPLE 35

16 g of pyrrolidino-[1,2-a]-benzimidazole are dissolved in 25 ml of glycol and 10 g of dimethyl sulfate are added at 100° C. The mixture is stirred for a further 30 hour at 100° C., 20 g of N-methyl-N-(2-chloroethyl)-p-aminobenzaldehyde are added, the batch is cooled to 80° C., 3 g of pyrrolidine are then added and the batch is kept at 80° C. for 3 hours. 6 g of N,N-dimethylethylenediamine are then added at 80° C., after which the mixture is heated for one hour at 140° C. On adding 25 g of glacial acetic acid, a liquid formulation of the dye of the formula

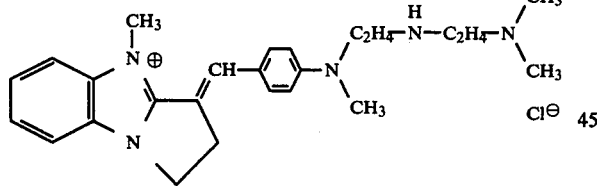

is obtained; this may be used for coloring paper and produces little pollution of the waste water.

Using a similar method to Example 35, reaction of a quaternized pyrrolidinobenzimidazole of the formula Id with a p-aminobenzaldehyde of the formula

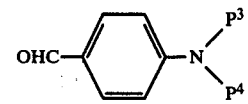

where P⁴ contains a leaving group Y, gives a compound of the formula Ij

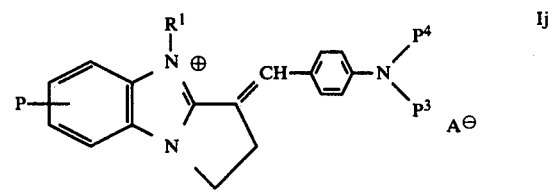

Reaction of this compound with an equimolar amount of an amine gives a compound of the general formula

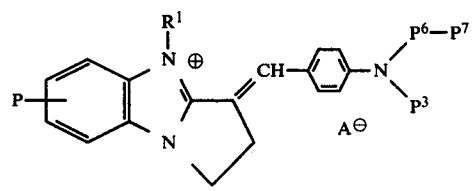

Table 3, below, lists further compounds which have been synthesized by methods similar to Example 35.

TABLE 3

| Example | R¹ | P | P³ | P⁶ | P⁷ |
|---|---|---|---|---|---|
| 36 | CH₃ | H | C₂H₅ | —C₂H₄— | HN—C₂H₄—N(CH₃)(CH₃) |
| 37 | " | " | " | CH₃ | " |
| 38 | " | CH₂—C₆H₅ | " | " | " |
| 39 | " | " | " | C₂H₅ | " |

TABLE 3-continued

| Example | R$^1$ | P | P$^3$ | P$^6$ | P$^7$ |
|---|---|---|---|---|---|
| 40 | " | " | " | " | HN—C$_2$H$_4$—NH$_2$ |
| 41 | CH$_3$ | " | " | " | HN—C$_3$H$_6$—NH$_2$ |
| 42 | " | " | " | " | HN—C$_6$H$_5$ |
| 43 | " | CH$_3$ | " | " | HN—C$_3$H$_6$—N—C$_3$H$_6$—NH$_2$<br>　　　　　　　H |
| 44 | " | " | " | —CH$_2$—CH—CH$_2$—<br>　　　　　OH | " |
| 45 | C$_2$H$_5$ | " | " | " | HN—C$_3$H$_7$ |
| 46 | " | " | " | " | N(C$_3$H$_7$)$_2$ |
| 47 | CH$_3$ | " | " | —C$_2$H$_4$— | —N(CH$_3$)$_2$ |
| 48 | " | H | " | " | N(CH$_3$)—C$_2$H$_4$—N(CH$_3$)$_2$ |
| 49 | " | " | " | " | N(CH$_3$)—C$_2$H$_4$—$^\oplus$N(CH$_3$)$_3$ |
| 50 | " | " | " | " | —HN—C$_6$H$_{12}$—HN$_2$ |

If, in Example 35, half a mole equivalent, instead of an equimolar amount, of a diamine or polyamine is added to the reaction mixture, dyes with double molecules are obtained. For example, adding half a mole of ethylenediamine in Example 35 results in the dye of the formula

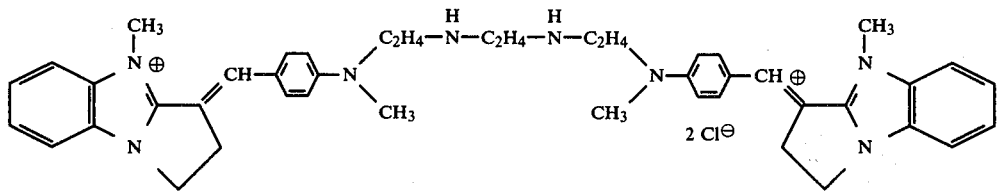

Table 4 lists further dyes which were obtained by methods similar to Example 35, by reaction with half a mole equivalent of a diamine or polyamine.

TABLE 4

| Example | P | R$^1$ | P$^3$ | P$^6$ | P$^8$ |
|---|---|---|---|---|---|
| 51 | H | CH$_3$ | C$_2$H$_5$ | C$_2$H$_4$ | —HN—C$_2$H$_4$—NH— |
| 52 | H | " | " | " | —HN—C$_3$H$_6$—NH— |
| 53 | H | " | " | CH$_3$ | " |
| 54 | " | " | " | " | —HN—C$_2$H$_4$—N(H)—C$_2$H$_4$—NH— |
| 55 | CH$_3$ | " | " | " | " |
| 56 | " | " | " | " | —HN—CH$_2$—C$_6$H$_4$—CH$_2$—NH— |
| 57 | " | " | C$_2$H$_5$ | " | " |
| 58 | H | " | " | " | —HN—C$_2$H$_4$$^\oplus$—N(CH$_3$)$_2$— |
| 59 | " | " | " | " | —HN—C$_6$H$_{12}$—NH— |
| 60 | " | " | " | " | —N(H)—C$_6$H$_4$—N(H)— |

TABLE 4-continued

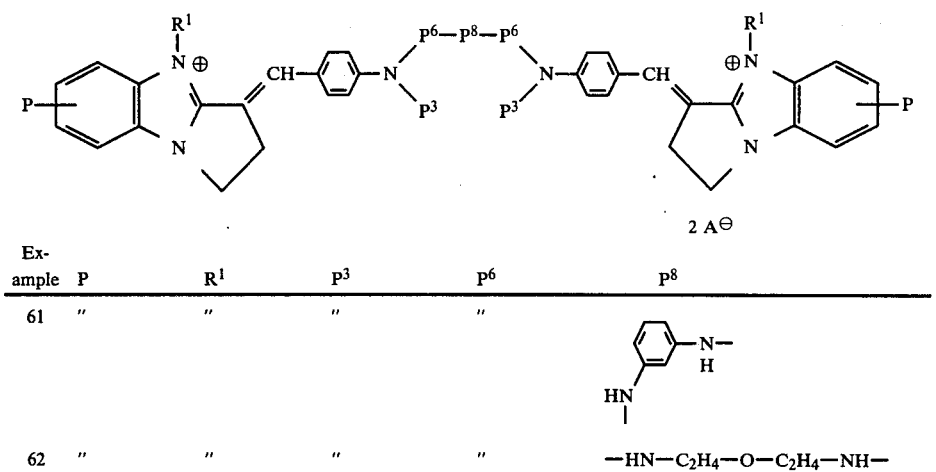

| Example | P | R[1] | P[3] | P[6] | P[8] |
|---|---|---|---|---|---|
| 61 | " | " | " | " | 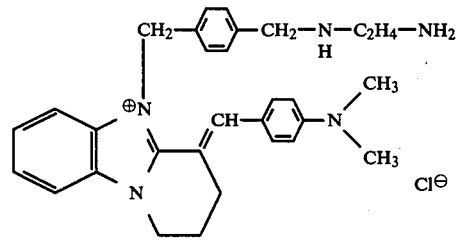 |
| 62 | " | " | " | " | —HN—C$_2$H$_4$—O—C$_2$H$_4$—NH— |

EXAMPLE 63

Using methods similar to those described in Examples 1, 20, 35 and 51, the corresponding piperidino compounds are obtained if the piperidino-[1,2-a]-benzimidazoles are used instead of the pyrrolidino-[1,2-a]-benzimidazoles. For example, using 17 g of piperidino-[1,2-a]-benzimidazole instead of 17.2 g of 5- and 6-methylpyrrolidino-[1,2-a]-benzimidazole in Example 1 gives the dye of the formula

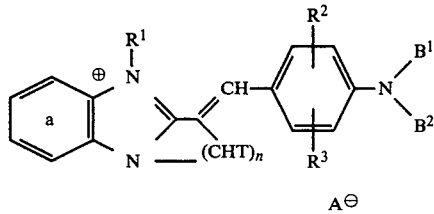

which differs from the dye of Example 1 in having a somewhat redder hue. The dye exhibits a high substantivity for groundwood, and bleached and unbleached sulfite and sulfate celluloses.

We claim:
1. A basic dye of the formula I:

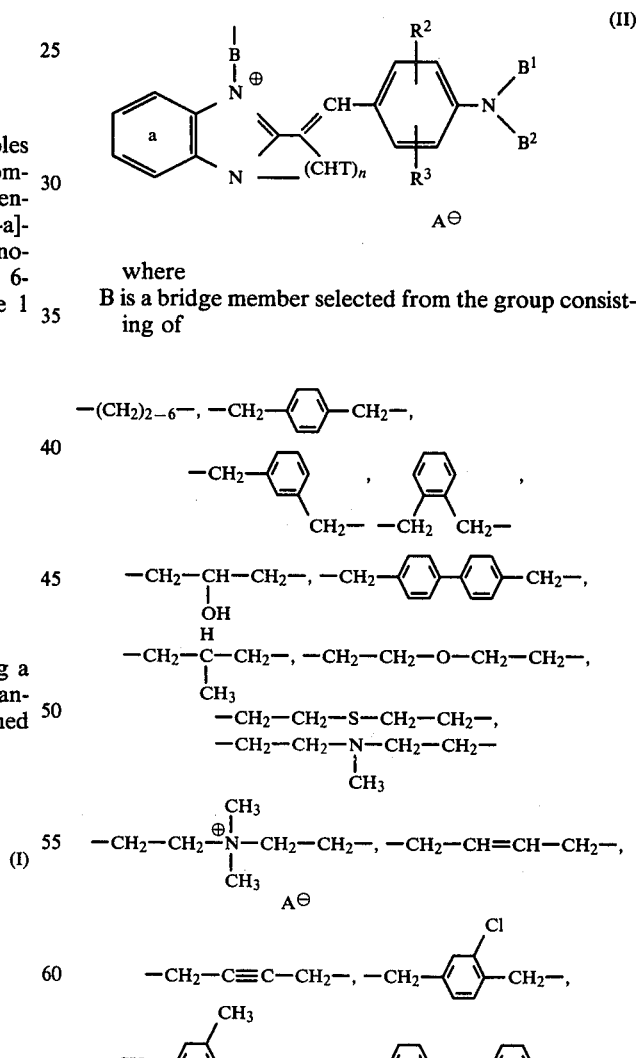

where
A$^\ominus$ is an anion,
R[1] is unsubstituted or substituted alkyl or a radical of the formula II:

where
B is a bridge member selected from the group consisting of

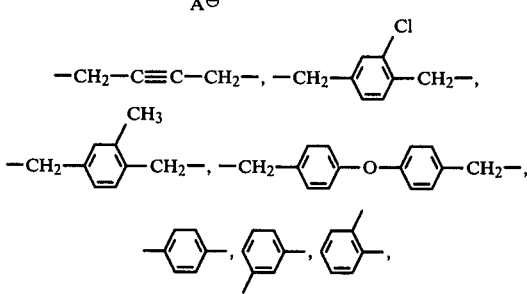

-continued

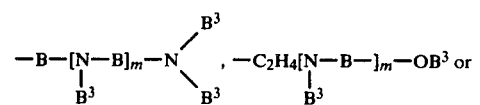

$-C_2H_4-\underset{H}{N}-C_2H_4-\underset{H}{N}-C_2H_4-,$ $-C_2H_4-\underset{H}{N}-CH_2-CH=CH-CH_2-\underset{H}{N}-C_2H_4-,$ $-C_4H_8-\underset{H}{N}-C_2H_4-\underset{H}{N}-C_4H_8-,$ $-CH_2-CH=CH-CH_2-\underset{H}{N}-C_2H_4-\underset{H}{N}-CH_2-CH=CH-CH_2-,$ $-CH_2-\langle\bigcirc\rangle-CH_2-\underset{H}{N}-C_3H_6-\underset{H}{N}-CH_2-\langle\bigcirc\rangle-CH_2-,$ $-C_4H_8-\underset{\underset{CH_3}{|}}{N}-C_2H_4-\underset{H}{N}-C_4H_8-,$ $-C_4H_8-\overset{\oplus}{\underset{\underset{CH_3}{|}}{N}}\overset{CH_3}{\underset{|}{\phantom{N}}}-C_2H_4-\underset{H}{N}-C_4H_8-,\text{ and}$ $A^\ominus$ $-CH_2-CH=CH-CH_2-\underset{H}{N}-C_2H_4-\underset{H}{N}-CH_2-\langle\bigcirc\rangle-CH_2-,$ n is 2, 3 or 4,
T is hydrogen or C₁-C₄-alkyl,
R² is hydrogen, methyl, ethyl, hydroxyl, methoxy or ethoxy,
R³ is hydrogen, chlorine, methyl or ethyl,
B¹ is hydrogen or unsubstituted or substituted alkyl,
B² is a radical of the formulae:

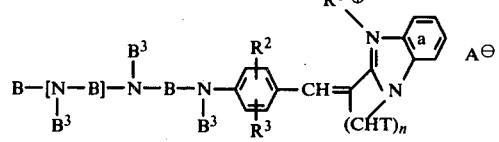

m is 0, 1, 2 or 3,
the radicals B³ independently of one another are hydrogen, C₁-C₄-alkyl, or C₂-C₃-alkyl which is substituted by —N—B³, hydroxyl or C₁-C₄-alkoxy, or both radicals B³ taken together are selected from the group consisting of a pyrrolidino, piperidino, morpholino, piperazino, N-methylpiperazino, N-β-hydroxyethyl-piperazino and hexamethyleneimino ring,
the ring a is unsubstituted or mono or polysubstituted by hydrogen, methyl, ethyl, chlorine, nitro or dimethylamino, provided that when R¹ is selected from the group consisting of a radical of the formula (II) and a radical containing a group of the formula

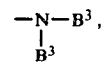

B² can additionally be selected from the group consisting of B¹ and

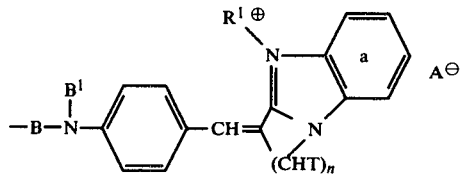

2. A dye as claimed in claim 1, where
n is 2,
R¹ is methyl or a radical of the structure $-C_2H_4-Z, -C_4H_8-Z,$
$-CH_2-CH=CH-CH_2-Z,$

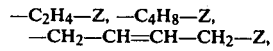

$-CH_2-CH=CH-CH_2-\underset{H}{N}-C_2H_4-\underset{H}{N}-CH_2-CH=CH-CH_2-Z,$ $-C_2H_4-\underset{H}{N}-C_2H_4-\underset{H}{N}-C_2H_4-Z \text{ or}$ $-C_4H_8-\underset{H}{N}-C_2H_4-\underset{H}{N}-C_4H_8-Z,$ T, R¹ and R³ are hydrogen,
B¹ is C₁-C₄-alkyl, chloroethyl, dimethylaminoethyl or benzyl,
B³ is hydrogen, methyl, chloroethyl or dimethylaminoethyl,
Z is a radical of the formula

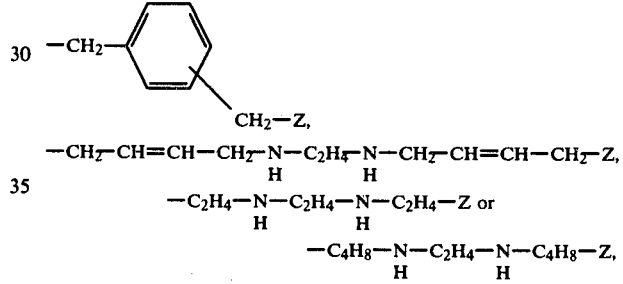

A⊖ and B² have the stated meanings and the ring a is substituted by methyl.

* * * * *

UNITED STATES PATENT AND TRADEMARK OFFICE
CERTIFICATE OF CORRECTION

PATENT NO. : 4,276,415

DATED : Jun. 30, 1981

INVENTOR(S) : HANS-JURGEN DEGEN

It is certified that error appears in the above—identified patent and that said Letters Patent is hereby corrected as shown below:

ON THE TITLE PAGE INSERT:

-- [73]--Assignee:

BASF Aktiengesellschaft

Rheinland-Pfalz, Germany --.

Signed and Sealed this

*Twenty-fourth* Day of *November 1981*

[SEAL]

*Attest:*

*Attesting Officer*

GERALD J. MOSSINGHOFF

*Commissioner of Patents and Trademarks*